United States Patent [19]

Edelstein et al.

[11] Patent Number: 5,034,951
[45] Date of Patent: Jul. 23, 1991

[54] FEMTOSECOND ULTRAVIOLET LASER USING ULTRA-THIN BETA BARIUM BORATE

[75] Inventors: Daniel C. Edelstein, Ithaca; Elliot S. Wachman, Dewitt, both of N.Y.; Lap K. Cheng, Newark, Del.; Chung L. Tang, Ithaca, N.Y.

[73] Assignee: Cornell Research Foundation, Inc., Ithaca, N.Y.

[21] Appl. No.: 581,090

[22] Filed: Sep. 11, 1990

Related U.S. Application Data

[63] Continuation of Ser. No. 373,064, Jun. 26, 1989, abandoned.

[51] Int. Cl.$^5$ .................................................. H01S 3/10
[52] U.S. Cl. ....................................... 372/22; 372/18; 372/25; 372/54; 307/427
[58] Field of Search ................... 307/425, 427; 372/53, 372/54, 9, 18, 21, 22, 25, 94

[56] References Cited

U.S. PATENT DOCUMENTS

| | | | |
|---|---|---|---|
| 3,934,154 | 1/1976 | Cook, Jr. ............................ | 307/88.3 |
| 4,617,665 | 10/1986 | Mourou et al. ....................... | 372/54 |
| 4,646,308 | 2/1987 | Kafka et al. ........................ | 372/25 |
| 4,748,631 | 5/1988 | Bjorklund ............................ | 372/22 |
| 4,793,894 | 12/1988 | Jacco et al. ..................... | 156/623 R |

OTHER PUBLICATIONS

"Flux Growth of Large Single Crystals of Low Temperature Phase Barium Barium Metaborate", Jiang et al., *Journal of Crystal Growth* 79 (1986), 963–969.
"Measurement of Ultrashort Optical Pulses with $\beta$-BaB$_2$O$_4$", Cheng et al., Appl. Phys. Lett. 52 (7), Feb. 15, 1988, pp. 519–521.
"Growth and Characterization of Low Temperature Phase Barium Metaborate Crystals", Cheng et al., Journal of Crystal Growth 89 (1988), 553–559, Feb., 1988.
"A New-Type Ultraviolet SHG Crystal-$\beta$-BaB$_2$O$_4$", Chen et al., Scientia Sinica (Series B), vol. 28, No. 3, Mar. 1985, pp. 235–243.
"Optical, Mechanical, and Thermal Properties of Barium Borate", Davis et al., J. Appl. Phys. 62 (5), Sep. 1, 1987, pp. 1968–1983.
"Efficient Deep-Ultraviolet Generation by Frequency Doubling in $\beta$-BaB$_2$O$_4$ Crystals", Miyazaki et al., Optics Letters, Dec. 1986, vol. 11, No. 12, pp. 797–799.
"Linear Electro-Optic Effect in Barium Metaborate", Nakatani et al., Appl. Phys. Lett. 52 (16), Apr. 18, 1988, pp. 1288–1290.
"Second-Harmonic Generation to 2048 A in $\beta$-BaB$_2$O$_4$", Kato, IEEE Journal of Quantum Electronics, vol. QE-22, No. 7, Jul. 1986, pp. 1013–1014.
"Widely Tunable Optical Parametric Oscillator Using Urea", Rosker et al., Journal of the Optical Society of America B, vol. 2, p. 691, May 1985.
"Continuous Parametric Generation of Picosecond Light Pulses", Piskarskas et al., Sov. J. Quantum Electron, 18(2), Feb. 1988, pp. 155–156.
"Parametric Chirp and 20-Fold Compression of Pulses from a Quasi-cw Picosecond Optical Parametric Oscillator", Piskarskas et al., Sov. J. Quantum electron, 15(11), Nov. 1985, pp. 1539–1541.

(List continue on next page.)

*Primary Examiner*—Léon Scott, Jr.
*Attorney, Agent, or Firm*—Jones, Tullar & Cooper

[57] ABSTRACT

A laser pulse generator utilizes intracavity doubling in an ultrathin beta barium metaborate crystal to produce femtosecond pulses in the ultrashort ultraviolet wavelength range. The generator includes a colliding-pulse passively mode-locked ring dye laser which propagates a pulsed beam of primary laser light in a cavity. The primary light beam has a repetition rate of $10^8$ Hz and a pulse width in the femtosecond range. The crystal is located in the cavity so that the primary beam strikes one crystal surface at Brewsters angle and propagates through the crystal at its phase-matching angle. The primary beam and its second harmonic are emitted from the opposite surface, the harmonic wave having the same repetition rate and substantially the same width as the primary beam, but one-half its wavelength.

10 Claims, 4 Drawing Sheets

"Generation of Synchronized Ultraviolet and Red Femtosecond Pulses", by Focht et al., IEEE Journal of Quantum Electronics, vol. 24, No. 2, Feb. 1988, pp. 431-434.

"Generation of Femtosecond UV Pulses by Intracavity Frequency Doubling in a Modelocked Dye Laser", Laermer et al., Optics Communications, vol. 67, No. 1, Jun. 1, 1988, pp. 58-62.

"Stabilization of a Femtosecond Dye Laser Synchronously Pumped by a Frequency-Doubled Mode-Locked YAG Laser", Chesnoy et al., Optics Letters, Oct. 1986, vol. 11, No. 10, pp. 635-637.

"Cavity-Length Detuning Effects and Stabilization of a Synchronously Pumped Femtosecond Linear Dye Laser", Dawson et al., Optics Letters, vol. 13, No. 2, Feb. 1988, pp. 126-128.

"Generation of Optical Pulses as Short as 27 Femtoseconds Directly From a Laser Balancing Self-Phase Modulation, Group-Velocity Dispersion, Saturable Absorption and Saturable Gain", Valdmanis et al., Optics Letters, Mar. 1985, vol. 10, No. 3, pp. 131-133.

"Generation of Optical Pulses Shorter than 0.1 psec by Colliding Pulse Mode Locking", Fork et al., Appl. Phys. Lett. (38) (9), May 1, 1981.

"Parametric Amplification in Spatially Extended Media and Application to the Design of Tuneable Oscillators at Optical Frequencies", Kroll, Physical Review, vol. 127, No. 4, Aug. 15, 1962, p. 1207.

"Tunable Coherent Parametric Oscillation in $LiNbO_3$ at Optical Frequencies", Giordmaine et al., Physical Review Letters, vol. 14, No. 24, Jun. 14, 1965, p. 973.

"Theory of Optical Parametric Oscillation Internal to the Laser Cavity", Oshman et al., IEEE Journal of Quantum Electronics, vol. QE-4, No. 8, Aug. 1968, p. 491.

"Experimental Observation of and Comments on Optical Parametric Oscillation Internal to the Laser Cavity", Smith et al., Journal of Applied Physics, vol. 41, No. 8, Jul. 1970, p. 3401.

"Proceedings of the VII International Quantum Electronics Conference", May 8-11 (1972), Montreal, p. 574, IEEE J. Quantum Electron. QE-8 (1972).

"Analytic Expressions for Ultrashort Pulse Generation in Mode-Locked Optical Parametric Oscillators", Becker et al., Journal of Applied Physics, vol. 45, No. 9, Sept. 1974, p. 3996.

"Optimal Focusing in a Singly Resonant Optical Parametric Oscillator", Fischer et al., Sov. J. Quantum Electronc. 7(12), Dec. 1977, p. 1455.

"The Effects of Focusing on Parametric Oscillation", Guha et al., IEEE Journal of Quantum Electronics, vol. QE-18, No. 5, May 1982, p. 907.

"Generation of Subpicosecond Continuously Frequency-Tunable Infrared Pulses", Bareika et al., Sov. J. Quantum Electron, 13(11), Nov. 1983, p. 1507.

"Tunable Subpicosecond Infrared Pulse Generation to 4 $\mu m$", Moore et al., Optics Letters, vol. 12, No. 7, Jul. 1987, p. 480.

"Generation of High-Peak-Power Tunable Infrared Femtosecond Pulses in an Organic Crystal: Application to Time Resolution of Weak Infrared Signals", Ledoux et al., Journal of the Optical Society of America B, vol. 4, p. 987, Jun. 1987.

"Tunable Femtosecond Radiation in the Mid-Infrared for Time-Resolved Absorption in Semiconductors", Jedju et al., Applied Optics, Feb. 1, 1988, vol. 27, No. 3, p. 615.

"Sub Picosecond Time-Resolved Infrared Spectral Photography", J. Optical Society of America B, vol. 4, p. 1061 (1986), Oct. 15, 1986.

"Generation and Kilohertz-Rate Amplication of Femtosecond Optical Pulses Around 800 nm", Knox, Journal of Optical Society of America B, vol. 4, 1771, Nov. 1987.

"Optical Parametric Amplification", Baumgartner et al., IEEE Journal of Quantum electronics, vol. QE-15, No. 6, Jun. 1979, p. 432.

"Optical Parametric Oscillator Threshold and Linewidth Studies", Brosnan et al., IEEE Journal of Quantum Electronics, vol. QE-15, No. 6, Jun. 1979, p. 415.

"Synchronously Pumped Optical Parametric Oscillator Using Beta-Barium Borate", Bromley et al., CLEO 1988 Regular Paper.

"High Power $BaB_2O_4$ Visible Optical Parametric Oscillator Pumped by Single-Axial-Mode 355-nm Pulses", Nolting et al., CLEO '88 Post Deadline Paper, p. 527.

FEMTOSECOND ULTRAVIOLET LASER USING ULTRA-THIN BETA BARIUM BORATE

This invention was made with Government support under Grants Nos. DMR-85-16616-A01 and A02 of the National Science Foundation, and Grants Nos. N00014-88-K-2035 and N00014-86-K-2010 of the U.S. Department of Defense.

This is a continuation of copending application Ser. No. 07/373,064 filed on June 26, 1989 abandoned.

BACKGROUND OF THE INVENTION

The present invention relates, in general, to apparatus for producing ultrashort (femtosecond) laser output pulses in the ultraviolet wavelength range. More particularly, the invention is directed to apparatus for producing ultrashort ultraviolet light through frequency conversion of pulses generated by lasers operating in the visible or near infrared frequency ranges.

There is a need to obtain femtosecond ($10^{-15}$ sec.) pulses throughout the optical spectrum. Most of the experimental results in the femtosecond time domain obtained to date have been derived from the rhodamine 6G-diethyloxadicarbocyanine iodide (Rh6G-DODCI) colliding-pulse passively mode-locked (CPM) dye laser operating at about 620 nm. Recent successes in finding other dye combinations that can produce ultrashort pulses at other wavelengths are limited to the visible and near-infrared.

Ultraviolet femtosecond (fs) pulses at 310 nm have been generated through extracavity or intracavity frequency doubling, but in the case of extracavity operation, the pulse repetition rate is drastically reduced from the repetition rate of the CPM laser. In the case of intracavity frequency doubling, potassium dihydrogen phosphate (KDP) has been used as the doubling crystal. However, the conversion efficiency is relatively low, and no measurement to establish the pulse width of the ultraviolet pulses has been reported. Measurements of high repetition rate ultraviolet pulse widths present a difficult problem, for conventional autocorrelation (AC) measurements cannot be used for femtosecond UV pulses in the 310 nm range because of the lack of suitable nonlinear crystals. Cross-correlation (CC) measurement through sum frequency mixing with the fundamental femtosecond pulse to 210 nm is a possible means of determining the UV pulse width, but there is a dearth of good nonlinear optical crystals in this short-wavelength region. Beta-barium borate $\beta$-$B_aB_2O_4$, or BBO) is the only nonlinear crystal that has a large enough nonlinear optical coefficient for phase-matched sum-frequency mixing in this spectral range, and it is transparent down to 190 nm. BBO has, however, a relatively large group velocity dispersion which tends to broaden the generated femtosecond pulses and this makes the pulse width measurements difficult unless extremely thin crystals are used. Such crystals, in turn, are difficult to fabricate and polish.

SUMMARY OF THE INVENTION

In accordance with the present invention, pulse generating apparatus is provided for producing intracavity doubling, in a beta-barium borate crystal, of femtosecond pulses in the ultraviolet. The apparatus provides nearly complete recovery of the normal fundamental output power in the form of ultraviolet pulses at the second harmonic, so that the device operates at high efficiency. Pulse widths down to 43 fs at a $10^8$ Hz repetition rate are produced, in accordance with the invention. Additionally, outputs as high as 20 mW per arm of a femtosecond CPM laser for pulses of slightly longer duration are achieved on a continuous-wave power level basis. The ultraviolet pulse widths are determined through detailed cross-correlation measurements based on sum-frequency mixing to 210 nm in ultrathin BBO crystals.

Although the technique of the present invention can be extended to other dye lasers, a preferred form of the invention utlizes a Rh6G-DODCI dispersion-compensated CPM ring dye laser with the output coupler replaced by a high reflector. The laser includes an intracavity focus, obtained by a pair of mirrors in a "Z" configuration, in which is located a BBO crystal. The primary, or fundamental, laser light impinges on one surface of the crystal and a second harmonic that is double the frequency of the impinging primary light is produced. The emitted light at the second harmonic frequency may be separated from the light at the primary frequency by an output coupling dichroic mirror. This second harmonic output signal is the desired signal, with a wavelength in the ultraviolet region.

Low temperature phase barium metaborate is an optical material which has a broad transparency, large optical nonlinearity, large birefringence, high optical damage threshold and a high fracture temperature. This material provides efficient coherent ultraviolet generation and, in accordance with the present invention, efficient frequency doubling of ultrashort pulses. In addition, the material is useful in optical parametric oscillators.

BRIEF DESCRIPTION OF DRAWINGS

The foregoing, and additional objects, features and advantages of the present invention will be apparent to those of skill in the art from the following detailed description of a preferred embodiment thereof, taken in conjunction with the accompanying drawings, in which:

FIG. 7 (*d*) is a graph of cross correlation width versus cross-correlation crystal thickness;

FIG. 7 (*e*) is a graph representing cross-correlation data for the crystal of FIG. 6 having a thickness of 55 $\mu$m.

DESCRIPTION OF PREFERRED EMBODIMENT

Low-temperature phase barium metaborate crystals may be grown utilizing the known top-seeded growth technique, as described by L. K. Cheng et al in an article entitled "Growth and Characterization of Low Temperature Phase Barium Metaborate Crystals", *J. Crystal Growth* 89 (1988) pp. 553-559. Optimization of the crystal growth parameters has led to the routine production of large single-crystal Beta BaB₂O₄ boules. The as-grown boules are typically 45-60 mm × 12 mm, although boules up to 15 mm thick have been obtained. Single crystals as large as 1 cm³ have been cut from these boules for characterization and device applications. The physical properties of the crystals obtained from different crystal growth runs are highly reproducible. Details of the growth and characterization of the crystals are reported in the Cheng et al article.

The optical properties of $\beta$-BaB$_2$O$_4$ have been investigated by serveral research groups, and are described in the following table:

| Properties | $\beta$-BaB$_2$O$_4$ Crystals |
|---|---|
| $\eta_0$ at 632.8 nm | 1.664 |
| $\eta_e$ at 632.8 nm | 1.547 |
| UV cutoff | 190.5 nm |
| IR cutoff | 3.28 $\mu$m |
| $\theta_{pm}$, I$^{ac}$ SHG at 1.064 $\mu$m | 22.81 ($\pm$00.1) |
| $\theta_{pm}$, II$^{ac}$ | 32.7 |
| [Na⁻] impurity | <100 ppm |

Figure 1:
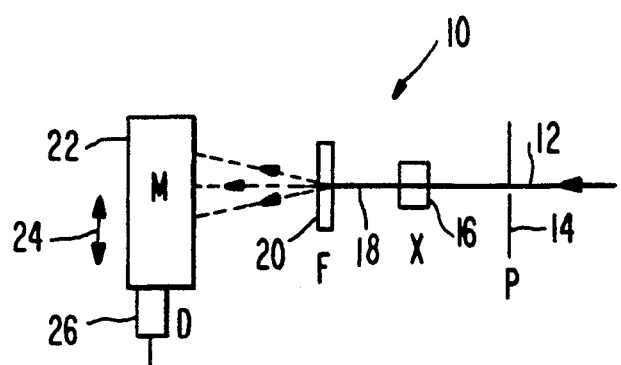
FIG. 1 is a diagrammatic illustration of an experimental apparatus for measurement of optical parametric oscillator tuning curves.

Measurement of the turning curves of an optical parametric oscillator (OPO) using a beta barium borate (BBO) crystal throughout the transparency range of the crystal may be carried out using the optical parametric luminescence technique in the experimental setup illustrated in FIG. 1. In this arrangement, a collimated pump beam 12 at 354.7 nm (or at 266 nm) was launched through a spatial filter 14 into a crystal 16 as an extraordinary wave. The beam 18 exiting the crystal passes through an ultraviolet cutoff filter 20 and enters a Schoeffel 0.2 $\mu$m double grating monochromater 22 mounted on a linear translation stage for motion in the direction of the arrows 24.

Translation of the monochromator normal to the direction of the pump beam allows the selection of the phase matching condition (collinear or noncollinear). To efficiently filter out the intense UV pump radiation, filter 20 is a 0.5" thick lucite sheet for the 354.7 nm radiation and a dilute CuSO₄ solution for the 266 nm radiation, respectively. The visible output of the parametric luminescence was detected with a red sensitive photomultiplier tube 26. For type I interaction, it can be shown that the collinear parametric luminescence output is an extremum in wavelength and in the present case, it gives the longest luminescence wavelength. Lateral translation of the monochromator allows the search for this longest wavelength and, therefore, the accurate determination of the OPO tuning curves. This is, however, not true for type II interaction, in which case care must be taken to assure that the entrance slit of the monochromator is located at the collinear parametric luminescence output direction. Due to the short interaction length of the $\beta$-BaB$_2$O$_4$ crystal (~5 mm) used in this experiment and the small crystal rotation angle, the lateral displacement of the beam did not exceed 1 mm at the detector, corresponding to an experimental uncertainty in wavelength of ±1 nm in the visible, or ~±15 nm in the infrared.

Figure 2:
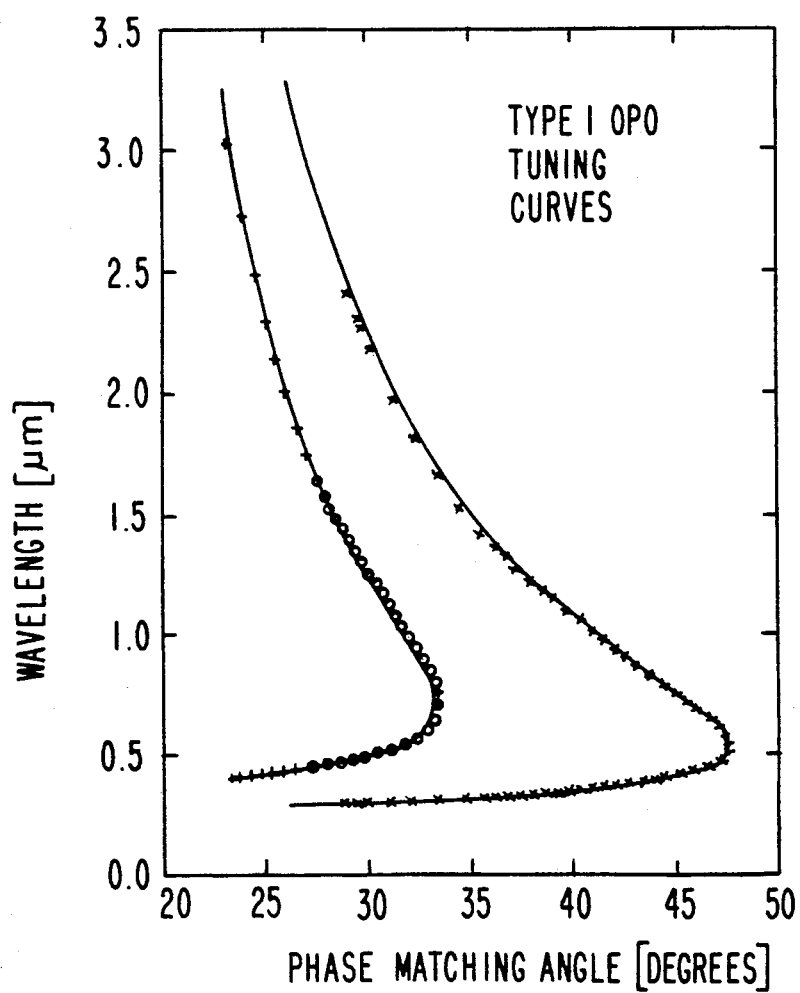
FIG. 2 is a graph illustrating Type I optical parametric tuning curves.
Figure 3:
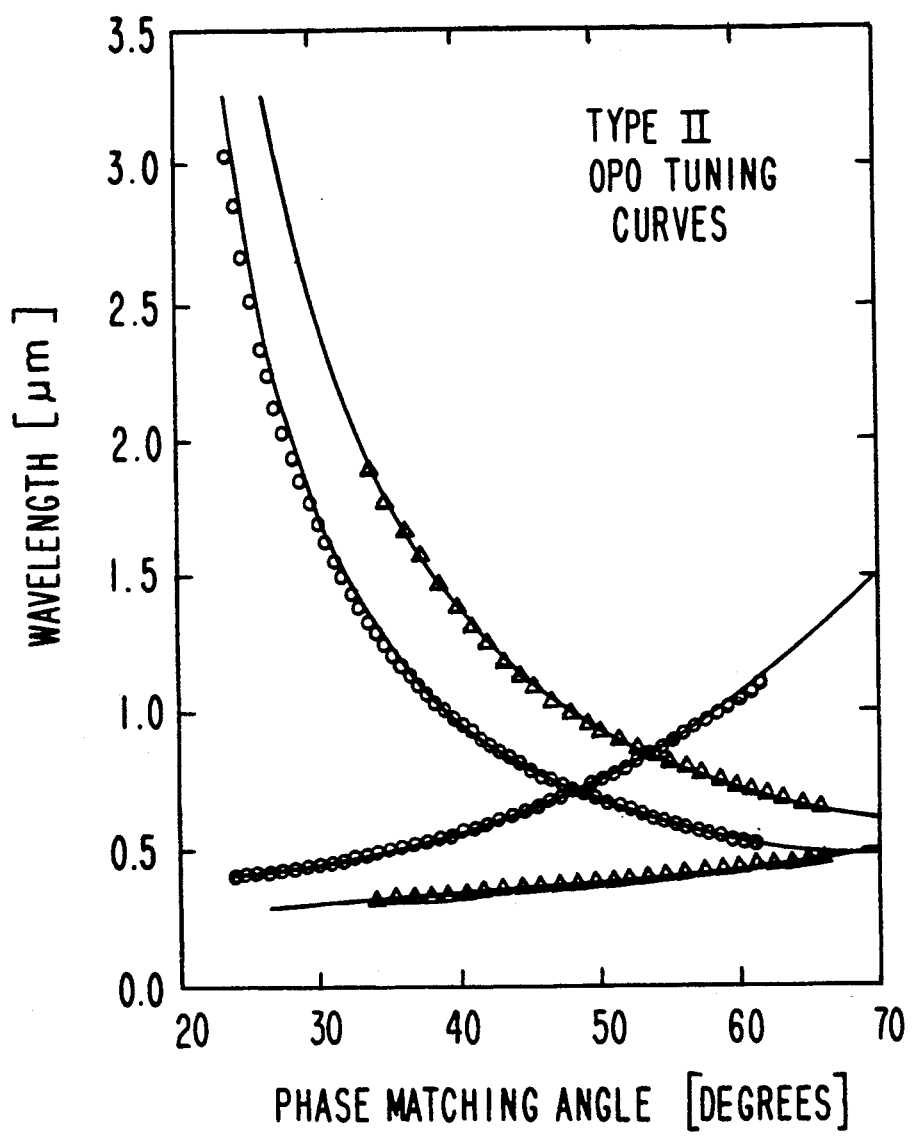
FIG. 3 is a graph illustrating Type II optical parametric tuning curves.

The 354.7 nm and 266 nm pumped type I OPO tuning curves shown in FIG. 2 were taken with two ~10×5 mm²×9 mm $\beta$-BaB$_2$O$_4$ crystals, which were cut at {$\theta$=30°, $\phi$=90°} and {$\theta$=40°, $\phi$=90°}. In the type II OPO tuning curve measurement, an ~8×8 mm²×5 mm crystal cut at {$\theta$=40°, $\phi$=0°} was used, with the results being shown in FIG. 3. In FIG. 2, the curves denoted by O show the 354.7 nm pumped parametric oscillation, while the + and × symbols are optical parametric luminescence data for 354.7 nm and 266 nm pumps, respectively. The solid lines represent predictions based on the Sellmeier equations reported by D. Eimerl et al in *Journal of Applied Physics*, 62, p. 1968 (1987). In FIG. 3, the O and $\Delta$ are collinear optical parametric luminescence data pumped at 354.7 and 266 nm, respectively. Again, the solid lines are predictions based on the Sellmeier equations.

Figure 4:
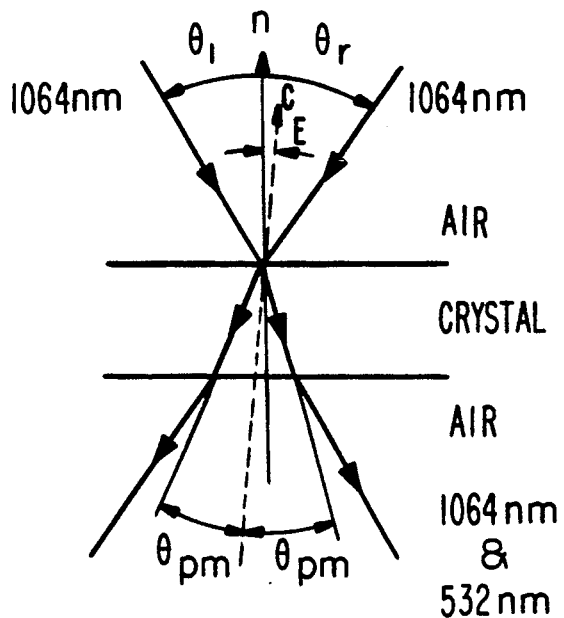
FIG. 4 is a diagrammtic illustration of an experimental configuration for the absolute determination of the Type I second harmonic generation phase matching angle at 1.064 $\mu$m.

In the above measurement, to rule out any measurement errors introduced in the crystal fabrication process, the type I second harmonic generation (SHG) phase matching angle at 1.064 $\mu$m, denoted as $\theta_{pm}'$ here, was used to calibrate the orientation of the $\beta$-BaB$_2$O$_4$ crystals (i.e. the crystal normals) used in this experiment. Absolute determination of the $\theta_{pm}'$ was done by obtaining the SHG on both sides of the optic axis [see FIG. 4] in another c-cut crystal. It is easy to show that, for type I interaction in a negative uniaxial crystal, the phase matching angle $\theta_{pm}'$ is given by $$\theta_{pm}' = \frac{1}{2}\left[\sin^{-1}\left(\frac{\sin\theta_l}{\eta_0}\right) + \sin^{-1}\left(\frac{\sin\theta_r}{\eta_0}\right)\right],$$

where $\theta_l$ and $\theta_r$ are the external SHG phase matching angles measure, n₀ is the ordinary refractive index at 1.064 $\mu$m, and $\epsilon$ [see FIG. 4] is the crystal fabrication "error" (i.e., the angle between the crystal normal and the optic axis). For the c-cut crystal above, the $\theta_{pm}'$ was found to be 22.81°±0.01° which is the value reported in Table I. This method can also be used for frequency doubling near the 90° point. To test the accuracy of this simple method, the $\theta_{pm}'$ was measured in several unoriented crystal samples, with $\epsilon$ ranging from 0.2° to 6.5°. The conoscopic pattern was used to place the optic axis of these crystals in the plane of incidence prior to the SHG measurement. The average value of $\theta_{pm}'$ was found to be 22.81±0.07°, in good agreement with the value given in Table I. The larger error is believed to be due to the curvature of the crystal surfaces and to the uncertainty in placing the optical axis in the plane of incidence. It is believed that this simple technique may be useful in the measurement of the phase matching properties of a new nonlinear optical material, where large crystal samples are often unavailable. The extension of this method to positive uniaxial crystals and to parametric luminescence measurement is straightforward.

A 10.5×10 mm²×11.5 mm long $\beta$-BaB$_2$O$_4$ crystal has been used to demonstrate optical parametric oscillation in the visible and near IR. The crystal was cut at $\theta$=30.2° and was uncoated. Type I interaction was used to maximize the parametric gain and the angular tuning rate. The singly resonant oscillator consisted of two identical mirrors ~50% reflective between 0.48 and 0.63 $\mu$m, and >85% transmissive beyond 0.76 $\mu$m. The mirrors were placed 16 mm apart, corresponding to ~50 cavity round trips for the 8 ns pump pulse used in this experiment. The pump pulse was obtained from the third harmonic of a commercial Q-switched neodymium-doped yttrium aluminum garnet (Nd:YAG) laser. A 3:1 telescope was used to propagate the pump beam to the far field, yielding a 1 mm spot size at the entrance of the OPO. At a pump intensity of ~130 MW/cm$^2$, the spontaneous parametric luminescence cone was readily observable and was used to aid in the alignment of the OPO.

Robust parametric oscillation was obtained throughout the reflectivity range of the OPO mirrors (0.48–0.63 $\mu$m and 0.81–1.36 $\mu$m) although weaker oscillation was also observed through the degenerate point and down to 0.45 $\mu$m where the reflectivity of the mirrors is only 25%. The conversion efficiency was measured with the signal wavelength at 505 nm, corresponding to an internal phase matching angle of 30.2°. The total energy conversion efficiency was 9.4% with an input pump energy of 15 mJ/pulse. The calculated parametric oscillator threshold, neglecting the effect of walk off and Fresnel loss, was ~5.3 mJ/pulse. Stable optical parametric oscillation was also observed through the visible and near IR region, using the 9 mm long, 30° cut crystal from the parametric luminescence experiments described above.

Figure 5:
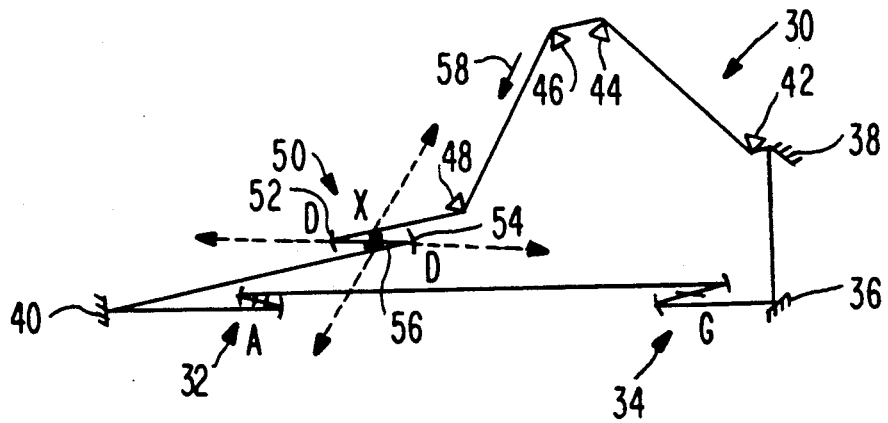
FIG. 5 is a schematic illustration of a colliding-pulse passively mode-locked dye laser incorporating a frequency doubling beta-barium borate crystal.

The BBO crystal described above also may be used as a frequency doubler to provide ultraviolet femtosecond pulses with high efficiency. This has been accomplished through the use of a Rh6G-DODCI dispersion-compensated CPM-ring dye laser such as that illustrated schematically at 30 in FIG. 5. Such a ring laser is described by J. A. Valdmanis et al in *Optical Letters* 10, p. 131 (1985). The laser 30 differs in that the output coupler (normally T ~2%) is replaced by a high reflector. The laser includes two intracavity focus locations, one being an absorber jet 32, and the other being a gain jet 34, includes reflectors 36, 38 and 40, and includes prisms 42, 44, 46 and 48 for directing light along the ring cavity. Interposed in the laser structure is a third intracavity focus location 50 obtained by two dichroic mirrors 52 and 54 spaced apart in a Z configuration, whereby light enters location 50 from prism 48, is reflected by mirror 52 onto mirror 54, and from there is directed to reflector 40. Also, there exists a counter-propagating beam which enters location 50 from reflector 40, proceeds from mirror 54 to 52, then to mirror prism 48 and around ring 30. The dichroic mirrors are on quartz substrates, with R ~100% at 630 nm and T ~80% at 315 nm.

Figure 6:
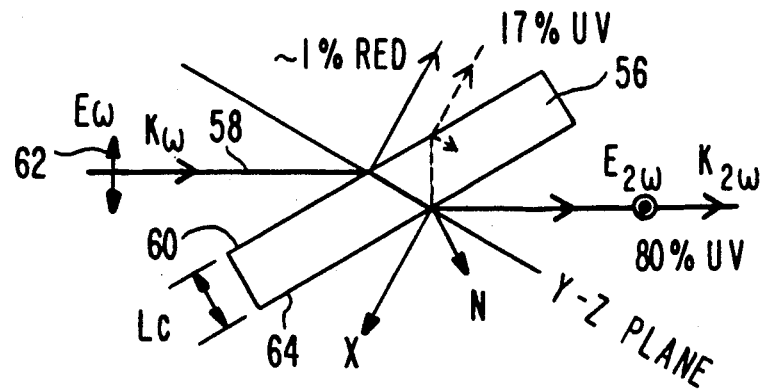
FIG. 6 is a top plan view of a beta-barium borate crystal for the laser of FIG. 5, illustrating the beam directions of red and ultraviolet light.

A beta barium metaborate optical crystal 56, cut at $\phi=45.5°$ from the X axis and $\theta=47.3°$ below the Z axis, is positioned in the ring laser cavity in the path of a beam 58 consisting of a train of pulses of center frequency $\omega$ propagating in the cavity, as illustrated in greater detail in FIG. 6. The beam 58 acts as a pump for the crystal, and is incident on the crystal surface 60 at Brewster's angle (59°). The beam is plane polarized, as illustrated by arrows 62, and propagates through the crystal as an ordinary wave at the phase-matching angle of 38°. The beam remains purely ordinary for small tuning angles in the Y-Z plane, an important feature for eliminating birefringence on the pump beam. With this orientation, the crystal produces no deleterious effects on the operation of the ring dye laser 30. In the illustration of FIG. 6, the x, y, z-axes are 52° below, and 38° above the plane of the page, respectively. N denotes the crystal normal, perpendicular to the surface 64, which is opposite and parallel to the surface 60. An exit beam 62' is emitted from the crystal at surface 64, and consists of a train of pulses of center frequency $2\omega$, which is double the frequency of the incident beam 62.

In testing the BBO crystal, three crystal thicknesses (Lc) were used. The crystals were cut and polished to thicknesses of 0.9 mm, 0.15 mm. and 55 $\mu$m for use in the cavity at location 50. With the 0.9 mm crystal, ~12 mW of UV light per arm with a pulse width of almost 400 fs was obtained from sub-100 fs pump pulses. The group velocity mismatch broadening was thus dominating the generation. The UV beam was elongated in the z direction with an aspect ratio of ~4:1 and a temporal sweep of the pulse across the longer dimension. These effects, arising from the 4° walk-off angle of the UV wave in the BBO crystal, are readily observable in such a thick crystal. The temporal sweep was observed by scanning a slit across the beam and performing successive cross-correlation (CC) measurements. The correlation traces were each narrower and shifted in time such that together they swept out the full width at half-maximum (FWHM) of the total-beam CC.

With the 0.15 mm crystal in the cavity 50 pumped by 40 fs red pulses, UV pulses as short as 59 fs in a round TEM$_{00}$ beam were obtained. For near 100 fs UV pulses, as much as 20 mW of UV and 5 mW of red light per arm were coupled out. The UV output did not decrease with the thinner crystal in the cavity, and the total power output was as much as can be obtained in an unmodified CPM laser during short-pulse operation. This represented complete conversion of the normal output to the second harmonic output.

Finally, a 55-$\mu$m-thick crystal was used in the cavity to generate still shorter pulses. With 49 fs red pumping pulses, 43 fs UV pulses with an average output power of several milliwatts were obtained. For pulses this short, however, it was found that measurements were limited by dispersion in extracavity optics present in the UV beam line. With adequate dispersion compensation, shorter pulse measurements should be obtained.

Ultraviolet pulses width measurements were obtained by cross correlation (CC) of the second harmonic and fundamental pulses by collinear type I sum-frequency generation (SFG) to 210 nm in various BBO crystals cut at $\theta\approx69°$. This third-harmonic signal was passed through a 0.2 $\mu$m UV monochromator and detected by a solar-blind photomultiplier tube (PMT). Autocorrelations (AC's) of the red pulses were done by collinear type I second-harmonic generation (SHG) in a thin crystal of KDP. All correlation data were acquired by rapid scanning of the time delay and signal averaging as described by M. J. Rosker et al in *Physics Review Letter* 57, p. 321 (1986). Finally, spectra of the red and UV light were obtained with a 0.5 $\mu$m scanning monochromator and a UV-visible PMT.

Crystal length (Lc) influences the generation and measurement of UV pulses in several ways: through broadening due to group velocity mismatch between fundamental and second-harmonic pulses [l$_c\Delta(\nu_g^{-1})_{SHG}$ and l$_c\Delta(\nu_g^{-1})_{CC}$, for the generation and measurement processes, respectively,]; through the spectral bandwidth of the interaction (l$_c\Delta\lambda$); and through the conversion efficiency (proportional to l$_c$d$^2_{eff}$ for optimal focusing). For type I SHG at 630 nm, the BBO crystal has the values $\Delta(\nu_g^{-1})_{SHG}=360$ fs/mm, l$_c\Delta\lambda=1.6$ nm mm, and d$_{eff}=2.5$ pm/V. For KDP these are 185 fs/mm, 3.1 nm mm, and 0.6 pm/V, respectively. Thus to exhibit the same broadening (and also spectral bandwidth) the BBO crystal would have to be roughly half the thickness of the KDP, but it still should achieve more than ten times the conversion efficiency (for optimal focusing in both cases). For the CC measurement, $\Delta(v_g^{-1})_{CC}=630$ fs/mm between ordinary waves at 630 and 315 nm, which is quite large. It is this that necessitates the use of ultrathin crystals for unambiguous measurements of the UV pulse widths.

CC measurements were performed with four BBO crystals of thicknesses 0.67 mm, 0.28 mm, 0.18 mm, and 85 μm. (In principle one could do a type II noncollinear difference frequency CC using KDP, BBO, or Urea, but this was found to be difficult in practice because of a large background of scattered red light). The CC signal is given by $$I_{CC}(\tau) \sim \int_{-\infty}^{\infty} sech^2\left(\frac{t}{\tau_{UV}/1.763}\right) \times \left[sech\left(\frac{t-\tau}{\tau_{red}/1.763}\right) \; sqr\left(\frac{t}{\Delta(v_g^{-1})_{CC}l_c} + \frac{1}{2}\right)\right]^2 dt, \quad (1)$$

where $$sqr(x) = \begin{cases} 1, & |x| \leq \tfrac{1}{2}, \\ 0, \text{otherwise}, \end{cases}$$

and denotes convolution.

This assumes a plane-wave interaction (valid for the case of weak focusing in the SFG crystal) and no measurement error due to group velocity mismatch between the incident waves with the generated wave at 210 nm.

Figure 7A:
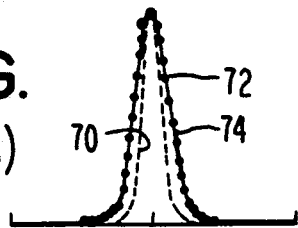
FIGS. 7 (*a*)-7 (*c*) are curves illustrating cross-correlation measurements for the crystal of FIG. 6 having a thickness of 0.15 mm.
Figure 7B:
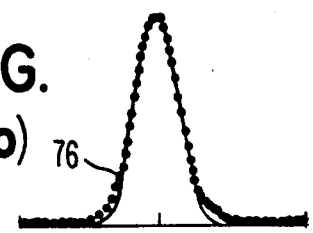
Figure 7C:
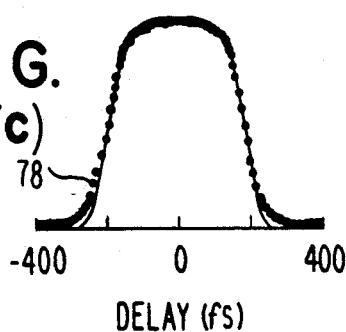
Figure 7D:
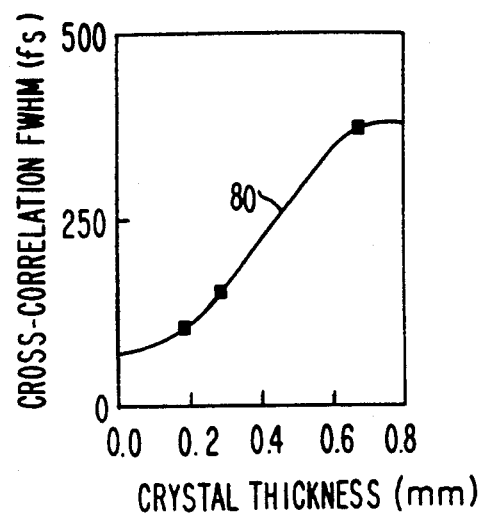
Figure 7E:
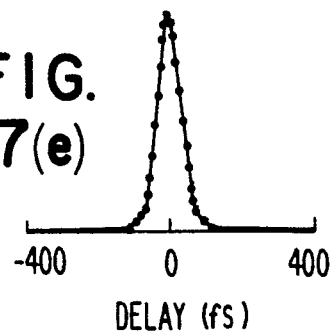
Figure 8:
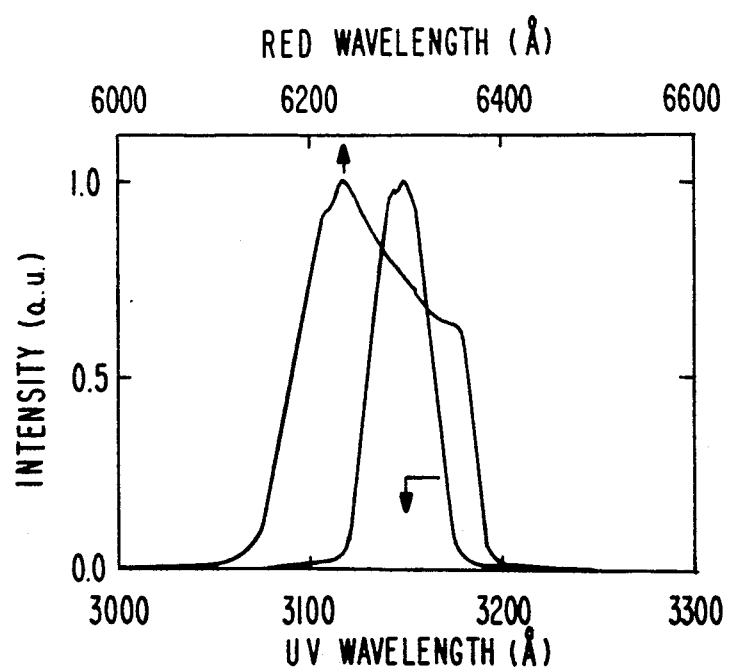
FIG. 8 is a graph of the spectra obtained of the frequency doubled laser of FIG. 5.

In FIGS. 2(a)–2(c) are CC data for the 0.15 mm intracavity crystal 56 taken consecutively with three different measurement crystals. The red autocorrelation (AC), corresponding to 40 fs sech² pulses, is shown as the dashed line 70 in FIG. 7(a), along using the CC data obtained with the 0.18 mm measurement crystal. The data is indicated by symbols (dots 72), with the curve fit from equation 1 indicated by the solid lines 74. Data for the 0.28 mm measurement crystal are shown in FIG. 7(b) by dots 76, and for the 0.67 mm crystal in FIG. 7(c) by dots 78. Note the measurement broadening with increasing Lc and, in particular, the rectangular shape of FIG. 7(c). All these data were fit simultaneously using Eq. (1) with $\tau_{red}=40$ fs, $\tau_{UV}=59$ fs, and $\Delta(v_g^{-1})_{CC}=630$ fs/mm. In FIG. 7(d) these results are shown on curve 80, generated by Eq. (1). It is believed, therefore, that the true UV pulse width can reliably be deconvolved from the broadened CC data. In FIG. 7(e) is shown CC data (dots) taken with the 55 μm intracavity crystal using an 85 μm BBO measurement crystal with 49 fs sech² red pulses. Using the same deconvolution technique, a UV pulse width of 43 fs is obtained illustrated by the solid line in FIG. 7(e). Finally, typical spectra for the UV and red light are plotted in FIG. 8; the UV FWHM is 35 Å, giving $\Delta v \Delta t=0.46$.

Thus, there has been provided apparatus for producing, in an existing CPM laser, second-harmonic ultraviolet light of high average power and short pulse width, the same pulse repetition rate as the CPM laser and, with high output beam quality. The device is well suited for frequency doubling in any femtosecond dye lasers, thereby expanding the presently available spectral range of such sources.

What is claimed is:

1. A femtosecond ultraviolet laser pulse generator, comprising:
    a colliding-pulse passively mode-locked ring dye laser operable to propagate a pulsed beam of primary laser light in a cavity, the beam pulses having a repetition rate of $10^8$ Hz and a pulse width in the femtosecond range;
    means for locating an ultra-thin beta-barium metaborate nonlinear optical crystal in said cavity, said crystal having first and second parallel surfaces and having a distance Lc between said surfaces sufficiently thin to reduce group velocity dispersion in said crystal, said crystal being so located that said pulsed beam of primary laser light impinges on one of the said crystal surfaces at Brewster's angle and propagates through said crystal at a phase-matching angle to produce an emitted beam having a component which is a second harmonic of said impinging pulsed beam, said emitted beam component having the same repetition rate as said incident beam, having a pulse width substantially the same as the pulse width of said incident beam, and having one-half the wavelength of, said incident beam pulses, and wherein the emitted beam has substantially the same total power as the incident beam, whereby a femtosecond pulsed laser having a wavelength in the ultrashort ultraviolet light range is produced.

2. The generator of claim 1, wherein said crystal has a thickness Lc between about 0.9 mm and 55 μm.

3. The generator of claim 1, wherein said cavity includes an intracavity focus location defined by a pair of reflecting mirrors, said crystal being positioned in said intracavity focus location to intercept said pulsed beams of primary laser light, said beam acting as a pump for said crystal.

4. The generator of claim 3, wherein said mirrors are in a Z configuration.

5. The generator of claim 3, wherein said mirrors are dichroic.

6. The generator of claim 4, further including cross correlation means for measuring the pulsewidth of said emitted beam second harmonic component.

7. The laser pulse generator of claim 3, wherein said crystal has an X axis and a Z axis, said crystal being cut at $\phi=45.5°$ from the X axis and $\phi=47.3°$ below the Z axis.

8. The laser pulse generator of claim 6, wherein said crystal has a distance Lc of about 55 μm.

9. The laser pulse generator of claim 8, wherein said primary laser beam pulses have a width of about 49 femtoseconds and produces an emitted beam having a width of about 43 femtoseconds.

10. The generator of claim 1, wherein said crystal has a distance Lc of about 55 m.

* * * * *